US008199764B2

(12) United States Patent
Hoffman et al.

(10) Patent No.: US 8,199,764 B2
(45) Date of Patent: Jun. 12, 2012

(54) SCALABLE APPROACH TO LARGE SCALE QUEUING THROUGH DYNAMIC RESOURCE ALLOCATION

(75) Inventors: Robert Hoffman, Santa Clara, CA (US); Raymond J. Kloth, Saratoga, CA (US); Alessandro Fulli, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1361 days.

(21) Appl. No.: 10/648,624

(22) Filed: Aug. 25, 2003

(65) Prior Publication Data

US 2005/0047338 A1    Mar. 3, 2005

(51) Int. Cl.
*H04L 12/56* (2006.01)
(52) U.S. Cl. ........................................ 370/412
(58) Field of Classification Search .................. None
See application file for complete search history.

(56) References Cited

U.S. PATENT DOCUMENTS

| | | | | |
|---|---|---|---|---|
| 5,696,930 | A | * | 12/1997 | Garetz et al. ................ 710/3 |
| 5,920,568 | A | | 7/1999 | Kurita et al. |
| 6,603,772 | B1 | | 8/2003 | Moussavi et al. ............ 370/432 |
| 6,625,121 | B1 | | 9/2003 | Lau et al. .................... 370/230 |
| 6,728,861 | B1 | * | 4/2004 | Roach et al. ................ 711/220 |
| 6,804,815 | B1 | * | 10/2004 | Kerr et al. .................. 718/100 |
| 6,961,342 | B1 | * | 11/2005 | Uzun et al. .................. 370/414 |
| 7,046,687 | B1 | * | 5/2006 | Brown et al. ................ 370/412 |
| 7,225,271 | B1 | | 5/2007 | DiBiasio et al. |
| 2001/0043564 | A1 | * | 11/2001 | Bloch et al. ................ 370/230 |
| 2002/0061027 | A1 | * | 5/2002 | Abiru et al. ................. 370/413 |
| 2002/0075884 | A1 | | 6/2002 | Wellen |
| 2003/0058880 | A1 | * | 3/2003 | Sarkinen et al. ............ 370/413 |
| 2003/0076849 | A1 | * | 4/2003 | Morgan et al. .............. 370/412 |
| 2003/0123468 | A1 | * | 7/2003 | Nong ........................... 370/412 |
| 2003/0126223 | A1 | * | 7/2003 | Jenne et al. .................. 709/212 |

(Continued)

FOREIGN PATENT DOCUMENTS

CN    1099923 A    3/1995

(Continued)

OTHER PUBLICATIONS

Examiner's Communication pursuant to Article 96(2) EPC dated Aug. 4, 2006, from corresponding European Patent Application No. 04 757 419.9, Scalable Approach to Large Scale Queuing Through Dynamic Resource Allocation, 6 pp.

(Continued)

*Primary Examiner* — Clemence Han
(74) *Attorney, Agent, or Firm* — Weaver Austin Villeneuve and Sampson LLP

(57) ABSTRACT

Methods and devices are provided for the efficient allocation and deletion of virtual output queues. According to some implementations, incoming packets are classified according to a queue in which the packet (or classification information for the packet) will be stored, e.g., according to a "Q" value. For example, a Q value may be a Q number defined as {Egress port number||Priority number||Ingress port number}. Only a single physical queue is allocated for each classification. When a physical queue is empty, the physical queue is preferably de-allocated and added to a "free list" of available physical queues. Accordingly, the total number of allocated physical queues preferably does not exceed the total number of classified packets. Because the input buffering requirements of Fiber Channel ("FC") and other protocols place limitations on the number of incoming packets, the dynamic allocation methods of the present invention result in a sparse allocation of physical queues.

27 Claims, 7 Drawing Sheets

U.S. PATENT DOCUMENTS

| | | | | |
|---|---|---|---|---|
| 2003/0189935 | A1* | 10/2003 | Warden et al. | 370/395.21 |
| 2003/0227925 | A1* | 12/2003 | Matsuo et al. | 370/395.32 |
| 2004/0085967 | A1* | 5/2004 | Boduch et al. | 370/395.42 |
| 2004/0090974 | A1* | 5/2004 | Balakrishnan et al. | 370/412 |
| 2004/0151197 | A1* | 8/2004 | Hui | 370/412 |
| 2004/0208197 | A1* | 10/2004 | Viswanathan | 370/466 |
| 2005/0089054 | A1* | 4/2005 | Ciancaglini et al. | 370/412 |
| 2005/0138238 | A1 | 6/2005 | Tierney et al. | |
| 2008/0008202 | A1* | 1/2008 | Terrell et al. | 370/401 |

FOREIGN PATENT DOCUMENTS

| | | | |
|---|---|---|---|
| CN | 1359241 | A | 7/2002 |
| EP | 1303079 | A2 | 4/2003 |
| EP | 1303087 | | 4/2003 |
| WO | WO94/20904 | | 9/1994 |
| WO | WO00/28705 | | 5/2000 |
| WO | WO01/47186 | | 6/2001 |

OTHER PUBLICATIONS

Examiner's Official Action dated Jun. 30, 2005, from corresponding Canadian Patent Application No. 2,531,813, Scalable Approach to Large Scale Queuing Through Dynamic Resource Allocation, 5 pp.

CISCO: "Interface Queue Management (white paper)" White Papers, Aug. 3, 1995. XP002210177. the whole document.

US Office Action mailed Aug. 2, 2007, from U.S. Appl. No. 10/791,673.

International Search Report dated Dec. 30, 2004 from International Application No. PCT/US2004/025091, 7 pages including Notification of Transmittal.

Written Opinion of the International Searching Authority dated Dec. 30, 2004 from International Application No. PCT/US2004/025091, 6 pages.

Examiner's Official Action dated Jan. 17, 2008 from Canadian Patent Application No. 2,531,813.

Chinese Office Action in corresponding application No. 200480020777.9 dated Nov. 21, 2008. 14 pages.

CN Office Action dated Mar. 11, 2010, Chinese Aplication No. 200480020777.9.

CN Office Action dated Aug. 9, 2010, Chinese Application No. 200480020777.9.

CN Office Action dated Mar. 11, 2010, Chinese Application No. 200480020777.9.

EP Office Action dated Apr. 18, 2011, European Application No. 200480020777.9.

* cited by examiner

SCALABLE APPROACH TO LARGE SCALE QUEUING THROUGH DYNAMIC RESOURCE ALLOCATION

BACKGROUND OF THE INVENTION

1. Field of the Invention

This invention relates generally to network management and specifically relates to controlling traffic flow in network devices.

2. Description of Related Art

In digital communications systems, data are transmitted between processing devices over a network. In such networks, data are typically sent from one computer to another through network devices such as hubs, routers, bridges and/or switches interconnected by data links.

Network devices have ports that send and receive data, commands, etc. (hereinafter, "data") to and from the data links. Although this disclosure will mainly refer to data sent in the form of packets, the present invention applies to any addressable entities, including but not limited to datagrams, cells, etc. Accordingly, the terms "packet," "frame," "cell," etc., will be used synonymously herein.

Within a single network device, packets are accepted at ingress ports, transferred across a switching fabric within the network device and received at egress ports for transmission over the next data link. If each input port maintains a single first-in, first-out ("FIFO") buffer or "queue," various difficulties can arise, FIG. 1 illustrates one such difficulty, known as head-of-line ("HOL") blocking. In this example of HOL blocking, more than one ingress port has a packet at the head of its queue that is destined for the same egress port at the same time. Ingress port 105 has a single queue 106, where incoming packets are stored until they are routed to an appropriate egress port. Similarly, ingress ports 110 and 115 have corresponding queues 111 and 116.

Suppose port 125 is not accepting packets, whereas ports 120 and 130 are free. Queue 116 has packets bound for port 130 and port 120, so these packets can be sent in sequence. However, queues 106 and 111 both have packets at the head of the line that need to be routed to egress port 125. The second packet in queue 106 needs to egress port 120 and the second packet in queue 111 needs to egress port 130. Even though ports 120 and 130 are free, the second packets in queues 106 and 111 will be blocked, because the HOL packets in each queue cannot be sent. Even if port 125 were accepting packets for egress, there would be contention between queues 106 and 111 for sending their HOL packets to port 125. This contention would need to be resolved before the next packets could be sent.

To eliminate HOL blocking, virtual output queues (VOQs) have been proposed. In VOQ implementations, ingress ports have a bank of queues, with one queue per category. Categories may include, for example, source, destination and priority. Packets are stored in random access buffers associated with the ingress ports. However, only pointers to the data need to be stored in the respective VOQs; the payloads may be stored elsewhere (e.g., in an off-chip random access memory).

In conventional VOQ implementations, the number of necessary queues needs to equal at least the total number of possible categories. As the number of categories increases, however, such implementations are not practical. For example, suppose a switch has 1024 ports and each ingress port has VOQs that include the categories of source, destination and priority. If each packet could have any one of 1024 destinations, 1024 sources and 4 levels of priority, over 4 million queues would be required for routing packets within the switch. If the queues are implemented as physical memories on a chip, over 4 million physical memories would be required.

This problem is exacerbated when one considers the high data transfer rates of recently-developed network devices. If a switch has, for example, 1000 ingress/egress ports transferring packets at 2 G/s, there are 1000 2 G/s data streams to manage. If the data structure to be managed has over 4 million entities to manage in a picosecond time frame, this is not a feasible management problem for hardware that will be available in the foreseeable future. Accordingly, it would be desirable to have improved methods of switching packets within network devices.

SUMMARY OF THE INVENTION

Methods and devices are provided for the efficient allocation and deletion of virtual output queues. According to some implementations, incoming packets are classified according to a queue in which the packet (or classification information for the packet) will be stored, e.g., according to a "Q" value. For example, a Q value may be a Q number defined as {Egress port number||Priority number||Ingress port number}. Only a single physical queue is allocated for each classification. When a physical queue is empty, the physical queue is preferably de-allocated and added to a "free list" of available physical queues. Accordingly, the total number of allocated physical queues preferably does not exceed the total number of classified packets.

Some implementations of the invention limit the number of allocated physical queues according to limitations on the number of packets that a particular ingress port can receive. Because the flow control mechanisms (e.g., input buffering requirements) of Fibre Channel ("FC") and other protocols place limitations on the number of incoming packets, the dynamic allocation methods of the present invention result in a sparse allocation of physical queues.

According to some implementations of the invention, a method of allocating queues in a network device is provided. The method includes the following steps: making a classification for an incoming packet; determining whether a queue has already been allocated for the classification; and allocating the queue when the queue has not already been allocated for the classification. The queue may be associated with an ingress port of the network device. The queue may be a virtual output queue.

The method may also include the steps of detecting when a queue is empty and de-allocating the empty queue. The method may also include the step of updating a memory when a queue is de-allocated, wherein the memory indicates whether the classification has already been allocated a queue. The network device may include a free list that indicates queues available for allocation, wherein the method further comprises updating the free list when a queue is de-allocated.

The classification may be based on a packet source, a packet destination or a packet priority. The classification may resolve to a Q number. The determining step may involve addressing a memory that indicates whether the classification has already been allocated a queue.

Some embodiments of the invention provide a network device that includes: a classifier for making a classification for an incoming packet; a determiner for determining whether a queue has already been allocated for the classification; and an allocator for allocating the queue when the queue has not already been allocated for the classification. The queue may be associated with an ingress port of the network device. The queue may be a virtual output queue.

The network device may also include a detector for detecting when a queue is empty and a de-allocator for de-allocating the empty queue.

The classification may be based on a packet source, a packet destination or a packet priority. The classification may resolve to a Q number.

In some embodiments, the determiner addresses a memory that indicates whether the classification has already been allocated a queue. The network device may also include a utility for updating a memory when a queue is de-allocated, wherein the memory indicates whether the classification has already been allocated a queue. The network device may include a free list that indicates queues available for allocation as well as a utility for updating the free list when a queue is de-allocated.

Other implementations of the invention provide a computer program embodied in a machine-readable medium. The computer program is configured to control a network device to perform the following steps: making a classification for an incoming packet; determining whether a queue has already been allocated for the classification; and allocating the queue when the queue has not already been allocated for the classification.

Yet other embodiments of the invention provide a network device. The network device includes the following components: a plurality of ports configured to receive incoming packets; a classification engine for making classifications for incoming packets; a memory that indicates whether a queue has already been allocated for a classification; and a processor for allocating the queue when the memory indicates that a queue has not already been allocated for the classification. The memory may be, for example, a content addressable memory or a random access memory.

Still other aspects of the invention proved a method of allocating queues in a network device. The method includes the following steps: having no queues allocated at a first time; receiving a first packet; making a first classification for the first packet; allocating a first queue for the first classification; receiving a second packet; making a second classification for the second packet; and determining whether the first classification is the same as the second classification.

The method may also include the step of allocating a second queue when the first classification is different from the second classification. The method may include the step of assigning the second packet to the first queue when the first classification is not different from the second classification.

Yet other aspects of the invention provide a method of allocating queues in a network device. The method includes the following steps: determining a first number of packets that an ingress port of the network device can receive; and allocating a second number of physical queues for the ingress port, wherein the second number is less than or equal to the first number. According to some such aspects of the invention, the network device operates according to the Fibre Channel protocol and the determining step is based on a number of buffer-to-buffer credits granted by the ingress port.

The method may also include the following steps: identifying a category for each packet arriving at the ingress port; correlating the category to an existing physical queue; and storing packet information in the physical queue. The packet information may be control information such as destination information, source information, priority information, payload type information and/or payload size information. The method may include these additional steps: identifying a category for each packet arriving at the ingress port; and assigning the category to a physical queue, wherein the network device allocates a new physical queue only when there is no existing physical queue for the category.

These and other features of the invention will be described below with respect to the following drawings.

DETAILED DESCRIPTION OF THE INVENTION

Figure 1:
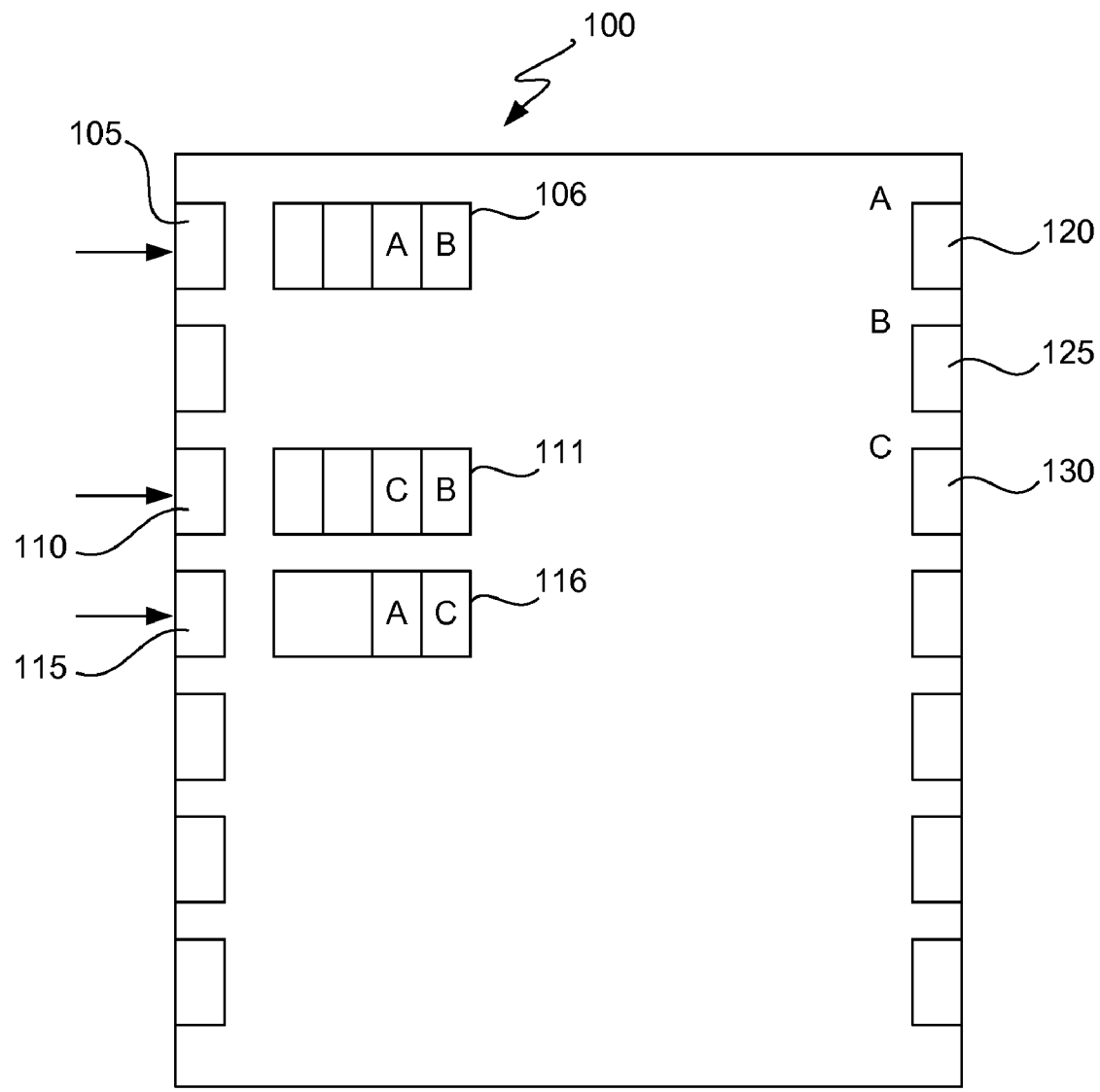
FIG. 1 is a block diagram that illustrates the problem of head-of-line blocking.
Figure 2:
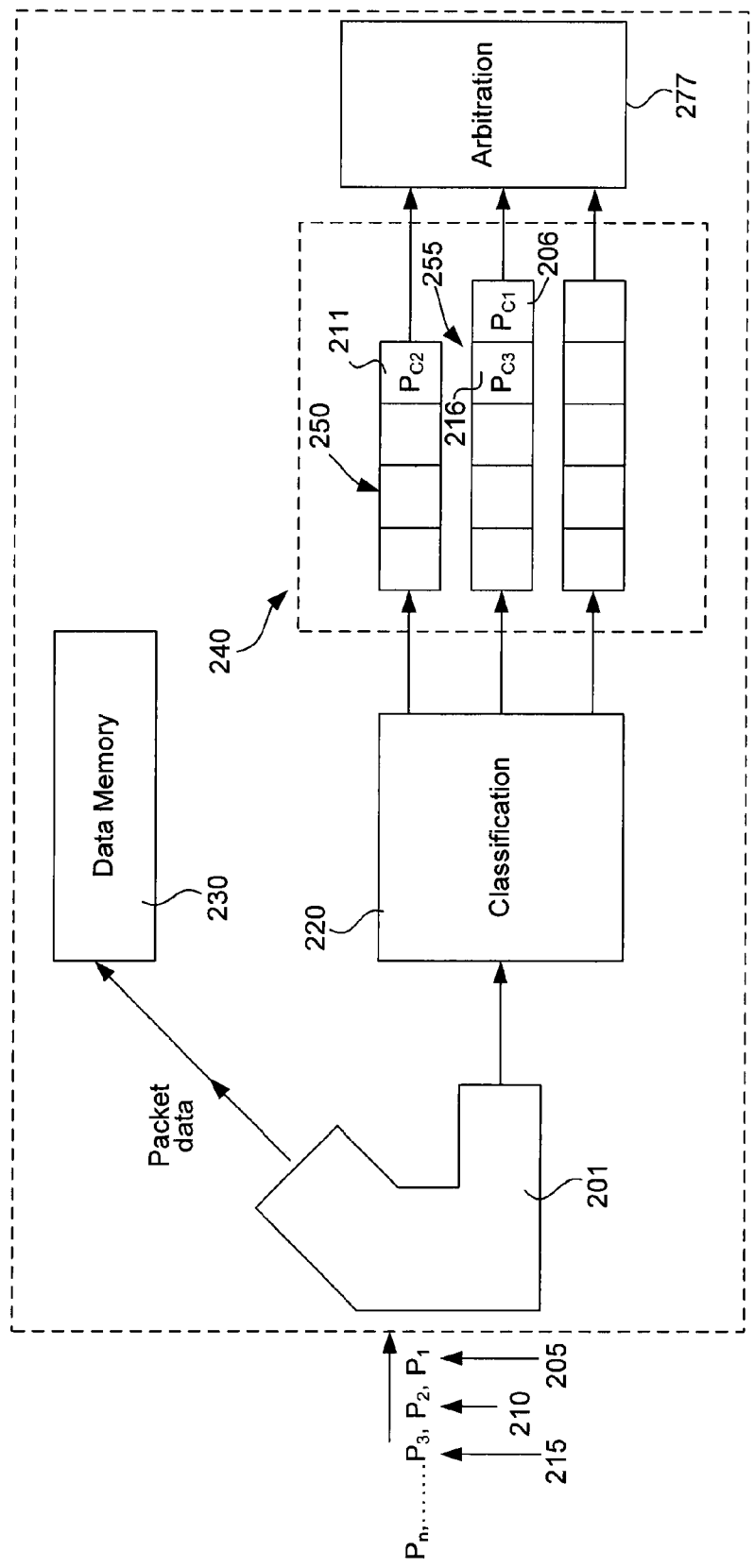
FIG. 2 is a block diagram of a network device.

FIG. 2 illustrates a series of packets arriving at device 200, which is a network device in this example. After the packets arrive at port 201, they are classified by classification engine 220, which may be implemented in software, hardware or firmware. For example, each packet may be sorted according to control information such as its destination, its source, its priority, payload type, etc.

After the classification step, control information for each packet is assigned to a different one of the queues in array 240. Each of the queues in array 240 may be, e.g., a first-in, first-out ("FIFO") buffer of a microprocessor (e.g., an ASIC). In this example, control information 206 for packet 205 is stored at the head of queue 255. Control information 216 for packet 215 is also stored in queue 255. Control information 211 for packet 210 is stored at the head of queue 250.

However, other packet information (e.g., the payload) that may require significantly more memory can be stored in data memory 230. Data memory 230 may reside, for example, in an off-chip memory such as an SRAM, a DRAM, etc. Pointers to the packet information stored in memory 230 are stored in array 240 or in memory associated with array 240. One such implementation is described below with reference to FIG. 3. In this way, the storage requirements for the buffers in array 240 are reduced.

Within a VOQ, packets are normally served in the order of arrival. As between VOQs, the flow of packets is controlled by an "arbiter" that schedules packets between the ingress ports and egress ports, using one or more arbitration algorithms. Such arbitration is necessary, for example, to match available destinations (i.e. destinations that can accept packets) with requesting sources (queues containing at least one packet). The arbitration algorithm will select from among the matching entities (e.g., in a round robin or a priority-weighted fashion) to determine which packet to serve next.

Therefore, after the classification step is an arbitration step, wherein arbiter 277 determines what will happen with the contents of each queue. Arbiter 277 may operate according to any applicable arbitration algorithms known by those of skill in the art. Arbiter 277 may be implemented in software, hardware or firmware.

Figure 3:
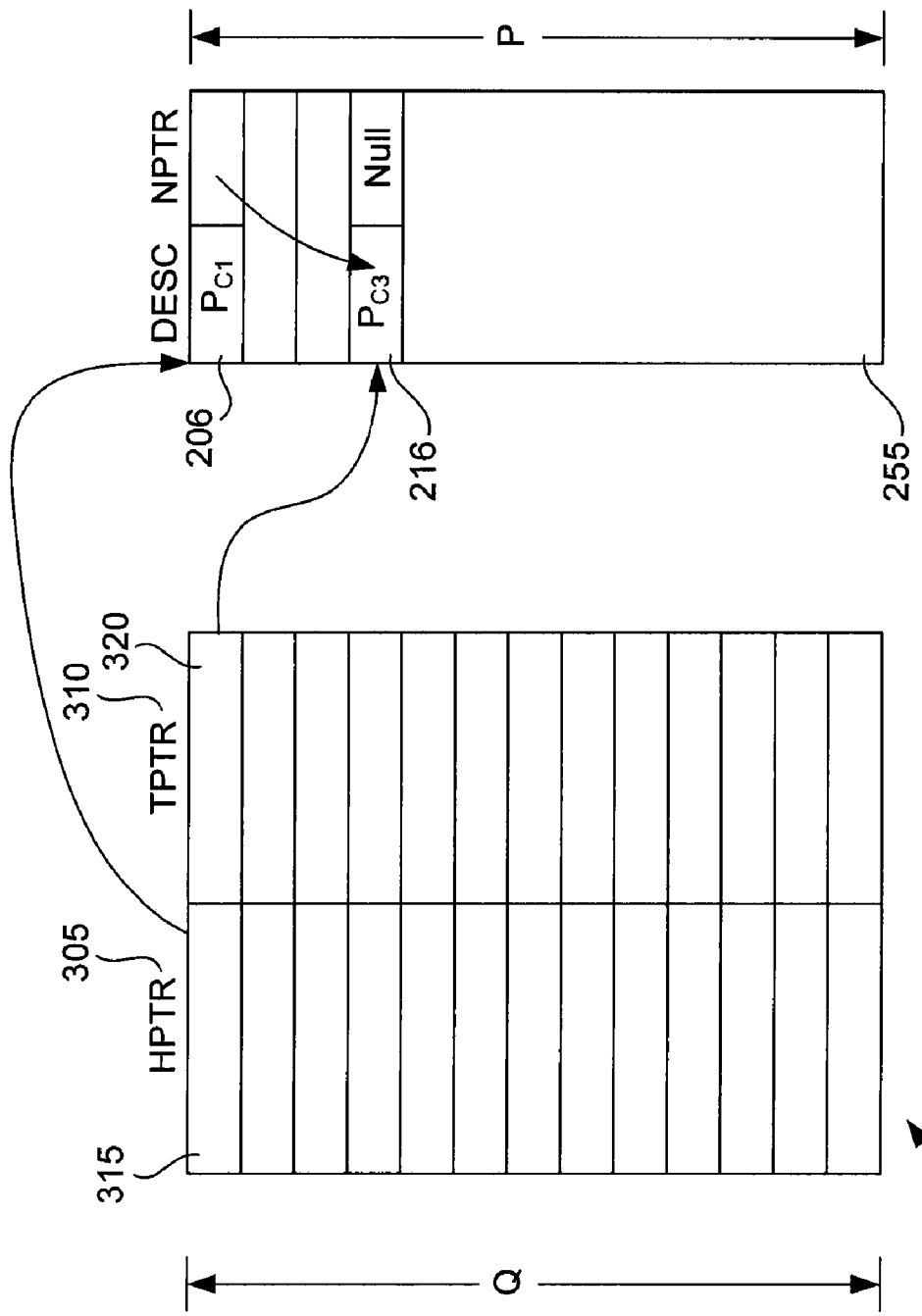
FIG. 3 illustrates part of one implementation of an on-chip VOQ.

FIG. 3 illustrates part of one implementation of an on-chip VOQ for maintaining an array of queues such as array 240 of FIG. 2. According to some implementations, in queue 255, each item of control information has an associated descriptor field and a "next pointer" that indicates the location of the next control information. The descriptor fields include both the control information upon which the classification was made and the location of the associated payload of the data packet.

However, in other implementations, the control information upon which the classification was made is implicit by location on "Q" memory, as described below. In general also the location of the associated payload can be inferred by "P" memory (e.g., memory 255). Therefore, in such implementations, the next pointer is the only necessary information.

The first descriptor in queue 255 is for control information 206. Therefore, this descriptor will include the relevant control information (e.g., source, destination or priority) and the location within data memory 230 (see FIG. 2) of the payload of packet 205. In this example, data memory 230 is an off-chip random access memory such as an SRAM or a DRAM. The associated next pointer indicates the location of control information 216, the next control information in queue 255. The "next pointer" field associated with control information 216 has a null value, because at this moment control information 216 is the last item of control information in queue 255.

Memory 300 includes head pointer field 305 and tail pointer field 310. Each head pointer indicates the location of the control information at the head of a queue and each tail pointer indicates the location of the control information at the tail of the same queue. In this example, head pointer 315 points to the location of control information 206 within queue 255 and tail pointer 320 points to the location of control information 216. Memory 300 has a depth of Q, the number of all possible classifications. The total size of memory 300 is Q*([size of HPTR field 305]+[size of TPTR field 310]).

The size P of buffer 255 depends on the limitations of input buffering and the corresponding number of packets that one wants to store in the system. In a Fibre Channel ("FC") system, for example, the number of packets that one wants to store per source is equal to the number of buffer-to-buffer credits that the link will provide. In the FC protocol, storage must be provided for a number of packets corresponding to that number of credits. Therefore, the total number of packets that need to be stored in array 240 is the total number of links times the number of credits per link. Typically, 16 packets per link may be stored in an input buffer of an FC switch, but in some current implementations 256 packets per link may be stored. As is known to those of skill in the art, similar input buffering limitations apply to other protocols and other types of network devices.

Figure 4:
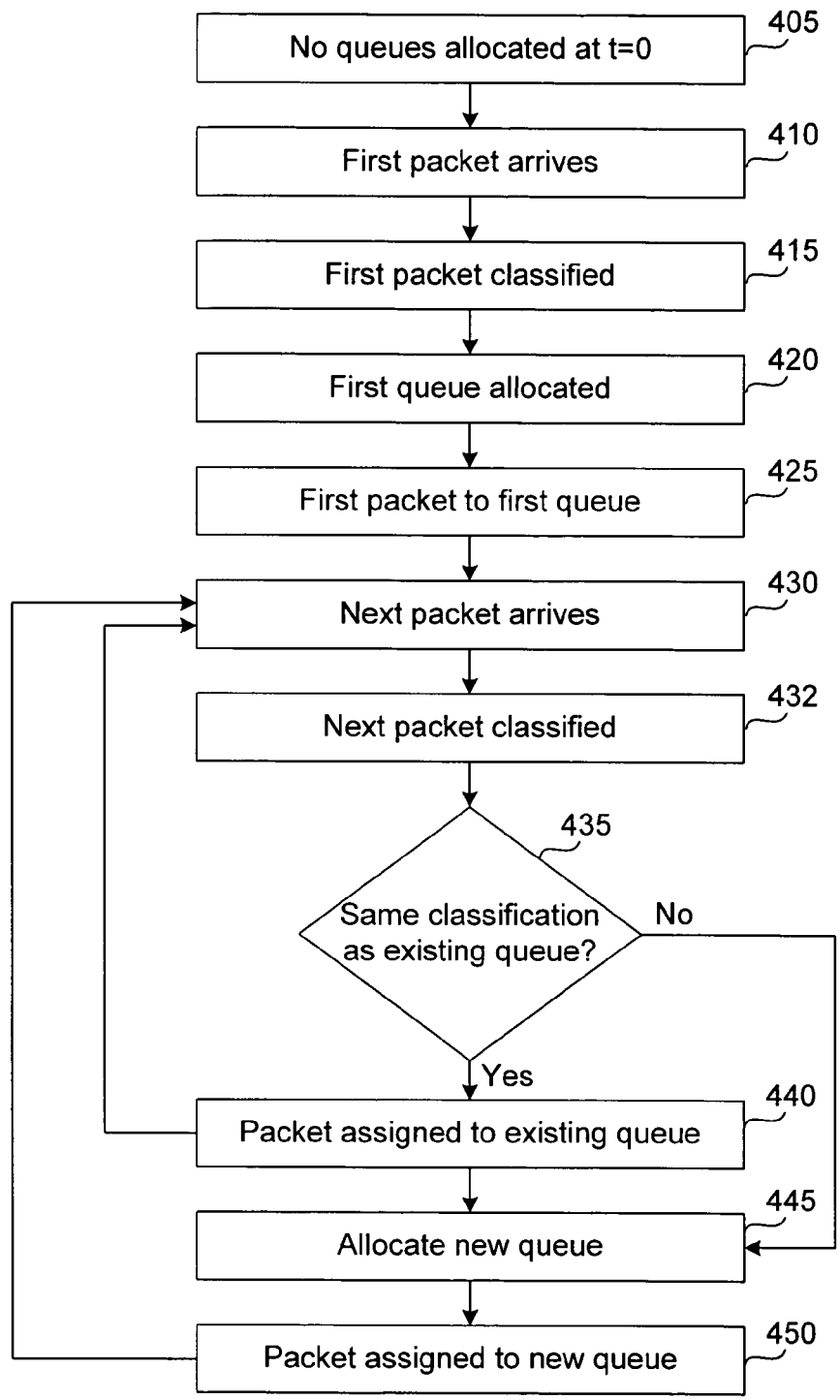
FIG. 4 is a flow chart that outlines some aspects of the invention.

FIG. 4 is a flow chart that provides a high-level overview of dynamic, sparse allocation of queues according to some implementations of the present invention. Step 405 represents an initial time (t=0) when no packets have yet arrived at an ingress port of a network device. Therefore, according to some preferred implementations of the invention, no physical queues have yet been allocated. A first packet arrives (step 410) and the packet is classified (step 415). The packet may be classified according to any convenient criteria, e.g., by source, destination, and/or priority. The classification may be performed, for example, by applying a hash function to fields of the first packet.

A physical queue is allocated in step 420 and the first packet is assigned to the first queue (step 425). The physical queue could be, for example, the type of queue described above with reference to FIGS. 2 and 3. In preferred implementations, "assigning" the first packet to the first queue involves storing classification information and pointer information for the first packet in the first free queue. In alternative implementations, assigning the first packet to the first queue involves storing the first packet in the first queue.

In step 430, the next packet arrives at the port. The packet is classified in step 432. Then, a determination is made as to whether there is an existing queue for the classification of the new packet (step 435). This determination may be made in any convenient way, e.g., by reference to a per queue empty bit stored and updated in a random access memory. One preferred implementation of the determination step will be described below with reference to FIG. 6.

If a physical queue is already allocated for the classification of the new packet, the packet is assigned to an existing physical queue. (Step 440.) However, if there is no physical queue yet allocated for the classification of the new packet, a physical packet is allocated for this purpose in step 445 and the packet is assigned to the new physical queue in step 450. Then, the next packet is arrived, is classified, and so on.

FIG. 4 and the preceding discussion assume that a second packet (and subsequent packets) arrive while the first packet is still in the queue. If the first packet should leave before the next packet arrives, the first queue would be de-allocated. The second packet would repeat all of the steps that applied to the initial packet. According to the above-described implementation, the second packet would be allocated a different virtual queue than was allocated to the first packet. However, in alternative implementations, the second packet could be allocated the same virtual queue that was allocated to the first packet.

Figure 5:
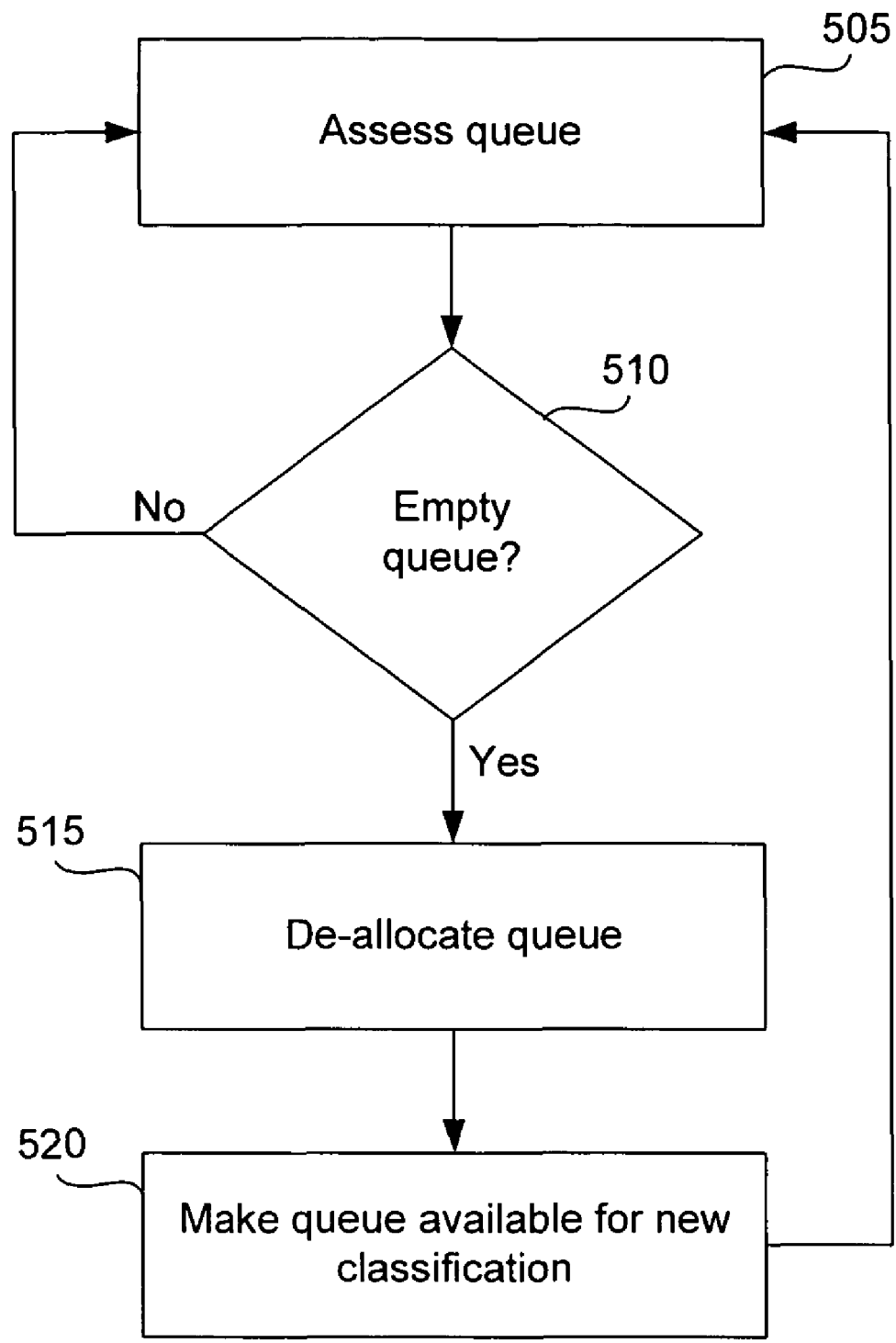
FIG. 5 is a flow chart that outlines other aspects of the invention.

Preferably, physical queues are also dynamically de-allocated when empty and made available for new classifications. FIG. 5 is a flow chart that represents an overview of this process. In step 505, allocated physical queues are polled and a determination is made as to whether they empty (step 510). In some implementations, steps 505 and 510 are performed in a single operation. If there are no empty queues, the queues are assessed again at a later time. For example, the queues may be assessed again during the next clock cycle, after a predetermined number of clock cycles, etc.

The queue check occurs upon every packet transmission on the transmit packet queue. When a packet is transmitted the queue status (empty) is updated and checked. Queue allocation and de-allocation is therefore event driven.

If one or more queues are determined to be empty, the queues are de-allocated in step 515 and made available for new classifications (step 520). Preferably, all memories associated with the de-allocated queues are updated at this time to indicate that the de-allocated queues are no longer associated with the old classifications.

Figure 6:
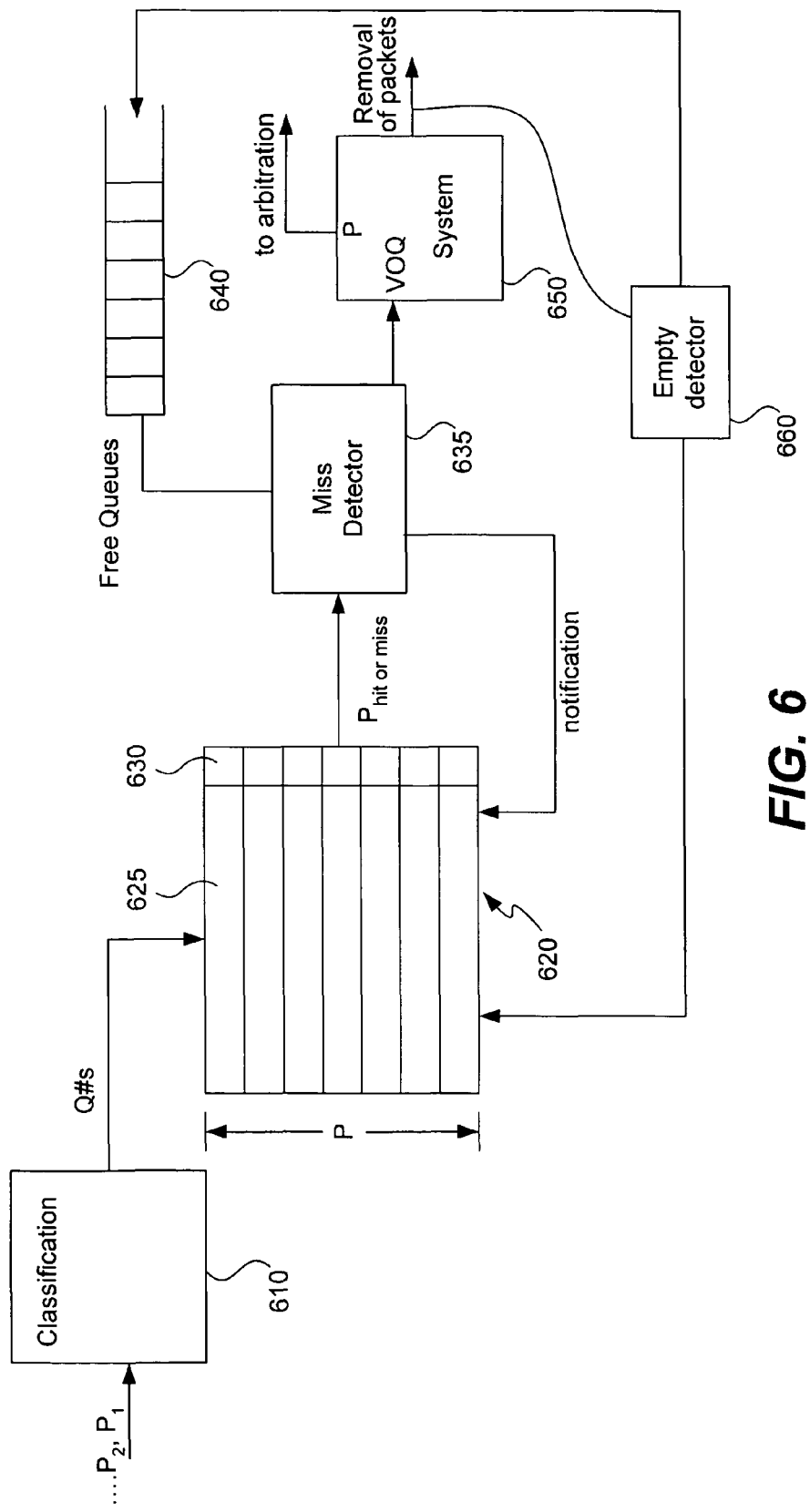
FIG. 6 is a block diagram that illustrates exemplary components of a network device for performing some aspects of the invention.

FIG. 6 is a block diagram that illustrates one preferred implementation of the methods described above with reference to FIGS. 4 and 5. Here, queue selection is done through classification of a packet to a value of Q. The classification mechanism 610 may classify packets, for example, by hashing packet fields, by a lookup table, etc. The resulting Q value (here, a number) indicates the queue in which control information for a packet will be stored.

The Q numbers are compared to the contents of a memory 620 of physical queues P implemented in hardware, such that there is sufficient state storage to allow a separate queue for every packet that the system can store. The memory 620 is preferably a content addressable memory ("CAM") but may be any other appropriate memory, e.g., an SRAM. In the implementation illustrated by FIG. 6, memory 620 is a CAM having Q number field 625 and valid bit field 630. Each line of the CAM, then, includes the number of a queue and an indication as to whether or not that queue has been assigned. One advantage of using a CAM for memory 620 is that its entire contents can be searched in one cycle.

If memory 620 is an SRAM, the Q number could be put into the address line of the SRAM. The data output from memory 620 could be the P value and a "hit" indication.

By addressing memory 620, it is determined whether the Q number of the incoming packet has an allocated physical queue P. If memory 620 is a CAM, for example, memory 620 looks for a match between the Q number of the incoming packet and a Q number in field 625 and determines whether the Q number in field 625 has a valid bit in field 630. If so, there is a "hit" and that physical queue will be supplied for the control information corresponding to the hit number. If not, miss detector 635 fetches a queue from free list 640 of "free queues," which are the free resources on chip.

Free list 640 may be, for example, a RAM initially having addresses equal to its contents. In one example, when a first packet is arriving (at t=0), there have been no allocated queues. Therefore, at time t=0, free list 640 would list all queues Q0, Q1, etc., up to QP. When a first packet arrives, there will be a miss and the first packet will be assigned Q0, which will be fetched from free list 640. Then, memory 620 will be notified of the allocation and will update the bit in field 630 corresponding to Q0 to a valid bit.

After packets have been assigned to queues, the packets and queues are used by VOQ system 650 in a manner similar to that of conventional VOQ systems known to those of skill in the art. However, there are distinctions between the VOQ system of the present invention and those of the prior art. For example, VOQ system 650 will need to deal with only P data structures, which is a much smaller number of queues than a conventional VOQ system would use for the same network device.

Another such difference from prior art VOQ systems involves the use of empty detector 660, which monitors VOQ system 650 and determines when a queue is empty. Then, empty detector 660 returns the corresponding Q number to free list 640 and notifies memory 620, which changes the corresponding value in field 630 to an invalid bit.

Figure 7:
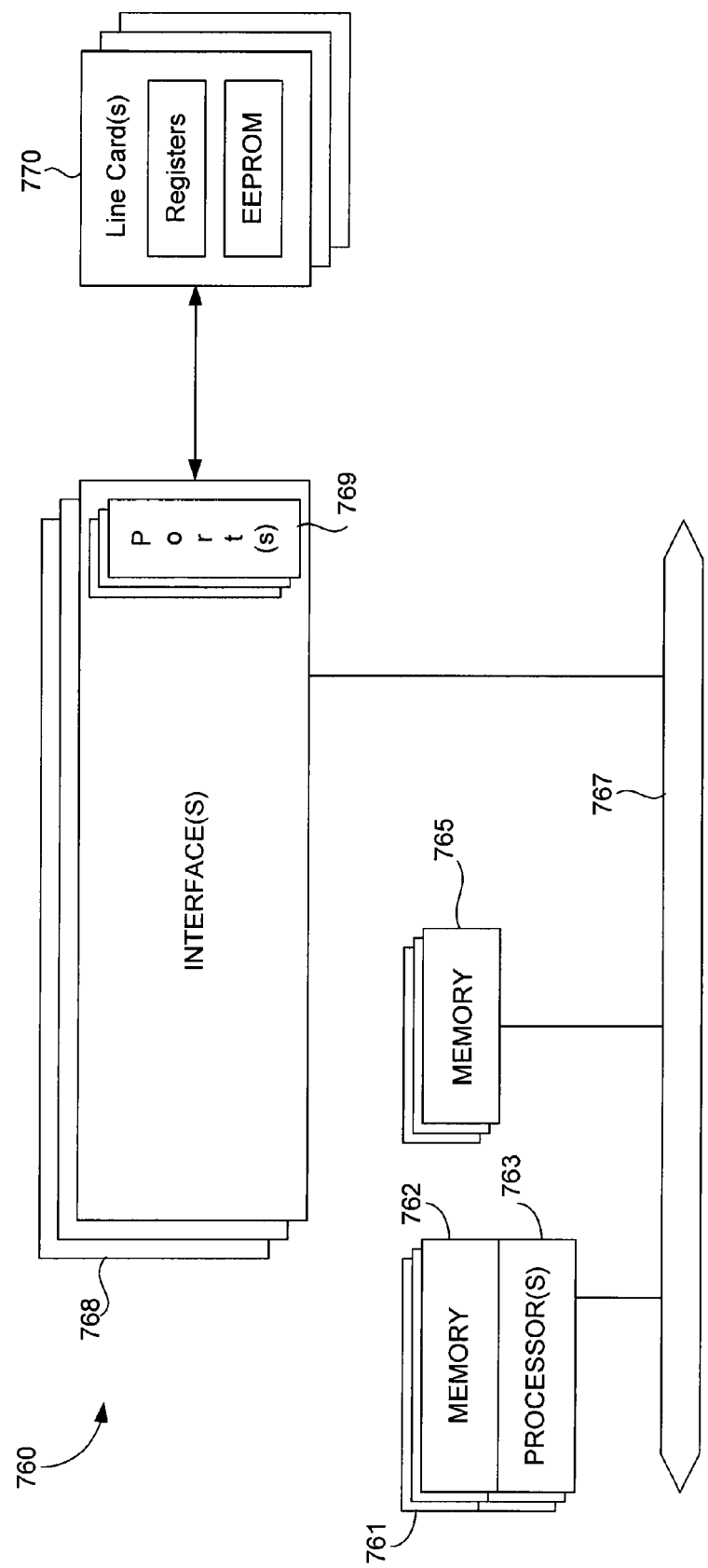
FIG. 7 is a block diagram that illustrates exemplary components of a network device for performing some aspects of the invention.

Referring now to FIG. 7, a network device 760 suitable for implementing the techniques of the present invention includes a master central processing unit (CPU) 761, interfaces 768, and a bus 767 (e.g., a PCI bus). When acting under the control of appropriate software or firmware, the CPU 761 may be responsible for implementing specific functions associated with the functions of a desired network device. For example, when configured as an intermediate router, the CPU 761 may be responsible for analyzing packets, encapsulating packets, and forwarding packets for transmission to a set-top box. The CPU 761 preferably accomplishes all these functions under the control of software including an operating system (e.g. Windows NT), and any appropriate applications software.

CPU 761 may include one or more processors 763 such as a processor from the Motorola family of microprocessors or the MIPS family of microprocessors. In an alternative embodiment, processor 763 is specially designed hardware for controlling the operations of network device 760. In a specific embodiment, a memory 762 (such as non-volatile RAM and/or ROM) also forms part of CPU 761. However, there are many different ways in which memory could be coupled to the system. Memory block 762 may be used for a variety of purposes such as, for example, caching and/or storing data, programming instructions, etc.

The interfaces 768 are typically provided as interface cards (sometimes referred to as "line cards") 770. Generally, they control the sending and receiving of data packets over the network and sometimes support other peripherals used with the network device 760. Among the interfaces that may be provided are Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports 769 appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 761 to efficiently perform routing computations, network diagnostics, security functions, etc.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of the network device's configuration, it may employ one or more memories or memory modules (such as, for example, memory block 765) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For instance, it will be appreciated that at least a portion of the functions described herein could be performed by one or more devices, e.g., by a microprocessor, by a cluster of microprocessors, etc. The invention is preferably implemented at ingress ports of an FC switch, but could be used in an Ethernet switch or other network device.

Moreover, the invention can be used in any system that needs to enqueue information, objects, etc., having a large number of categories and a smaller number of units that can be categorized at any given time. For example, the invention is applicable to a sorting machine for sorting objects having a large number of possible characteristics (e.g., size, shape, color, or other attributes) and a smaller number of possible sorting operations at any given time. For example, the invention could be implemented in a machine that sorts objects having a large number of possible colors (e.g., 1000 colors), but which can only sort a small number of objects at any given time (e.g., 10 objects). Considering these and other variations, the scope of the invention should be determined with reference to the appended claims.

We claim:

1. A method of allocating queues in a network device, the method comprising:
   receiving a packet at an ingress port of a network device, wherein the ingress port has a plurality of virtual queues;
   making a classification for the packet according to a virtual queue from said plurality of virtual queues;
   determining, by searching a memory of allocated physical queues, whether a previously-allocated physical queue exists for the classification;
   allocating a physical queue for the classification corresponding to the virtual queue when no previously-allocated physical queue exists for the classification;
   associating the physical queue with the ingress port;
   storing information associated with the packet in the allocated physical queue, wherein the information comprises pointer information corresponding to a location of a payload of the packet, and wherein the payload for the packet is stored in a separate data structure from the physical queue; and
   scheduling the packet for transmission between the ingress port and one of a plurality of egress ports of the network device.

2. The method of claim 1, wherein the virtual queue is a virtual output queue.

3. The method of claim 1, further comprising:
   detecting when a previously-allocated physical queue is empty; and
   de-allocating the empty previously-allocated physical queue.

4. The method of claim 3, further comprising updating a memory when a physical queue is de-allocated, wherein the memory indicates whether the classification corresponds to the previously-allocated physical queue.

5. The method of claim 3, wherein the network device further comprises a free list that indicates physical queues available for allocation and wherein the method further comprises updating the free list when the previously-allocated physical queue is de-allocated.

6. The method of claim 1, wherein the virtual queue is associated with an ingress port.

7. The method of claim 1, wherein the classification is based on one or more of a packet source, a packet destination, an ingress port number, an egress port number, or a packet priority.

8. The method of claim 1, wherein the classification further comprises a priority number.

9. The method of claim 1, wherein the determining step comprises addressing the memory of allocated physical queues in a single cycle.

10. The method of claim 1, further comprising:
    determining a first number of packets that the ingress port of the network device can receive; and
    allocating a second number of physical queues for the ingress port, wherein the second number is less than or equal to the first number.

11. The method of claim 10, wherein the network device operates according to a Fibre Channel protocol and wherein the determining step is based on a number of buffer-to-buffer credits granted by the ingress port.

12. The method of claim 10, further comprising:
    identifying a category for each packet arriving at the ingress port;
    correlating the category to an existing physical queue; and
    storing packet information in the existing physical queue.

13. The network device of claim 12, wherein the packet information comprises control information selected from a list consisting of destination information, source information, priority information, payload type information and payload size information.

14. The method of claim 10, further comprising:
    identifying a category for each packet arriving at the ingress port; and
    assigning the category to a physical queue, wherein the network device allocates a new physical queue only when there is no existing physical queue for the category.

15. A computer program embodied in a non-transitory computer readable storage medium, the computer program configured to control a network device to perform steps comprising:
    receiving a packet at an ingress port of the network device, wherein the ingress port has a plurality of virtual queues;
    making a classification for the packet according to a virtual queue from said plurality of virtual queues;
    determining, by searching a memory of allocated physical queues, whether a previously-allocated physical queue exists for the classification;
    allocating a physical queue for the classification corresponding to the virtual queue when no previously-allocated physical queue exists for the classification;
    associating the physical queue with the ingress port;
    storing information associated with the packet in the allocated physical queue, wherein the information comprises pointer information corresponding to a location of the payload for the packet, and wherein the payload for the packet is stored in a separate data structure from the physical queue; and
    scheduling the packet for transmission between the ingress port and one of a plurality of egress ports of the network device.

16. The computer program product of claim 15, wherein the virtual queue is associated with an ingress port of the network device.

17. The computer program product of claim 15, wherein the virtual queue is a virtual output queue.

18. The computer program product of claim 15, the computer program further configured to control a network device to:
    detect when the physical queue is empty; and
    de-allocate the empty physical queue.

19. The computer program product of claim 18, the computer program further configured to control a network device to update a memory when the physical queue is de-allocated, wherein the memory indicates whether the classification corresponds to the previously-allocated physical queue.

20. The computer program product of claim 18, wherein the network device further comprises a free list that indicates physical queues available for allocation.

21. The computer program product of claim 20, the computer program further configured to control a network device to update the free list when the previously-allocated physical queue is de-allocated.

22. The computer program product of claim 15, wherein the classification is based on one or more of a packet source, a packet destination, an ingress port number, an egress port number, or a packet priority.

23. The computer program product of claim 15, wherein the classification comprises a priority number.

24. The computer program product of claim 15, wherein the determining means comprises means for addressing the memory.

25. A network device, comprising:
- a plurality of ingress ports configured to receive an incoming packet, wherein one or more of the ingress ports has a plurality of virtual queues;
- a classification engine for making a classification for the incoming packet according to a virtual queue to which the packet, or information relating to the packet, will be assigned, wherein the virtual queue is one of said plurality of virtual queues associated with an ingress port that receives the incoming packet;
- a content addressable memory that indicates whether a previously-allocated physical queue exists for the classification; and
- a processor configured to:
    - allocate a physical queue for the classification corresponding to the virtual queue when no previously-allocated physical queue exists for the classification;
    - associate the physical queue with the ingress port;
    - store information associated with the packet in the allocated physical queue, wherein the information comprises pointer information corresponding to a location of a payload of the packet, and wherein the payload for the packet is stored in a separate data structure from the physical queue; and
    - schedule the packet for transmission between the ingress port and one of a plurality of egress ports of the network device.

26. The network device of claim 25, wherein the content addressable memory is searchable in one clock cycle.

27. The network device of claim 25, wherein the memory is a random access memory.

* * * * *